July 27, 1954  H. E. SCHONBERG  2,684,603
PRESSURE WELDING APPARATUS
Original Filed Sept. 20, 1945  2 Sheets-Sheet 1
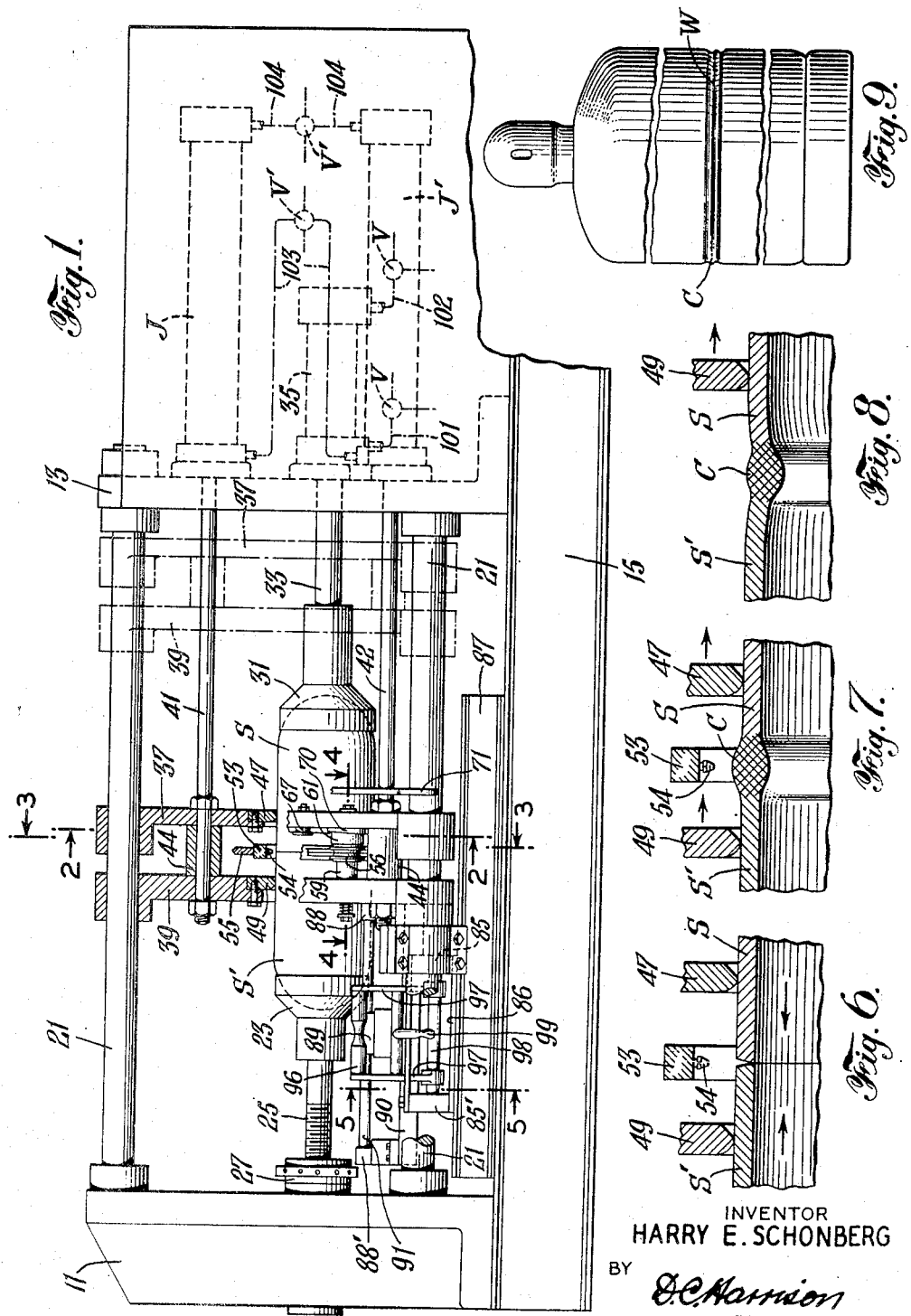
INVENTOR
HARRY E. SCHONBERG
BY
O.C.Harrison
ATTORNEY July 27, 1954  H. E. SCHONBERG  2,684,603
PRESSURE WELDING APPARATUS
Original Filed Sept. 20, 1945  2 Sheets-Sheet 2
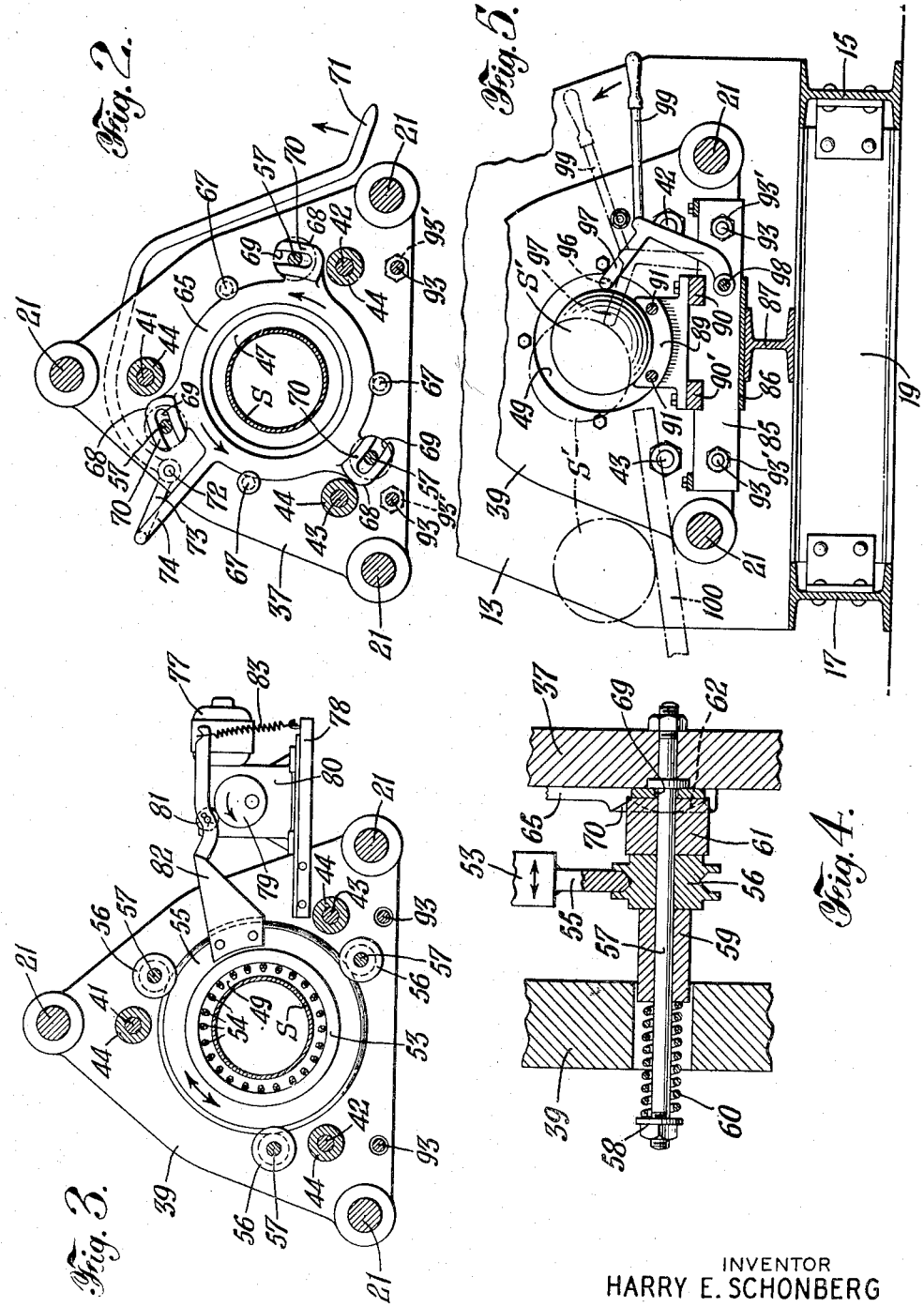
INVENTOR
HARRY E. SCHONBERG
BY
D.C. Harrison
ATTORNEY Patented July 27, 1954

2,684,603

UNITED STATES PATENT OFFICE 2,684,603

PRESSURE WELDING APPARATUS

Harry E. Schonberg, Indianapolis, Ind., assignor, by mesne assignments, to Union Carbide and Carbon Corporation, a corporation of New York Original application September 20, 1945, Serial No. 617,601. Divided and this application July 11, 1950, Serial No. 173,147

7 Claims. (Cl. 78—84)

This invention relates to the production of welded metal articles; and more especially it concerns a novel hollow pressure welded article having curvilinear side walls, and a novel process and apparatus for the production of such an article from weldable metals and alloys by a rapid welding operation conducted at temperatures at which the metal is plastic but not molten. The invention has especial utility for the production of welded metal containers by a pressure welding operation joining two cylindrical half sections along a girth seam in such manner that the crest of the protruding ridge of upset metal formed at the welding zone concurrently is preserved in part and is depressed to a point not substantially higher than the general level of the exterior surface of the welded container, without scratching, gouging or otherwise marring the welded joint or reducing its strength and other properties.

Cylinders and other containers made from steel and other high strength metals have long been used for the storage and transportation of compressed gases such as oxygen, acetylene, propane, chlorine, nitrogen, and the like. It is common practice to apply a protective paint to the entire outer surfaces of such gas containers. Where the containers have been made by welding two hollow sections together, either by a fusion-welding or a pressure-welding process, whereby a circumferential ridge or bead of upset metal projects outwardly beyond the level of the adjoining external surfaces of the container, the paint on the ridge or bead of metal wears off rapidly due to handling and to contact with adjacent containers while in storage, and elsewhere. This not only mars the appearance of the containers but also exposes the welded joint to attack by the atmosphere, moisture, and any other corrosive gas which may be present, resulting in a layer of rust and deterioration of the container along the welded joint. The present invention overcomes this difficulty and provides a container which retains a good appearance and a well-protected welded joint during its active life.

Among the more important objects of the invention are the following: the production in novel manner of a welded hollow article such as a cylindrical container from two half sections of weldable metal, which container, while made by a pressure welding operation at temperatures no higher than the solidus temperature of the metal, has the exterior surface at the welded joint substantially flush with the surface of the container at points remote from the joint; the production in novel manner of a welded container by a pressure welding operation, which container has the crest of upset metal at and adjacent the welding zone substantially flush with the outer surface of the container remote from the welded zone; to provide a novel pressure welding process and apparatus wherein means for aligning the members to be welded, means for applying the welding heat to the abutting members, means for oscillating the heating means peripherally of the container, means for reciprocating the heating means across the interface between the abutting margins of the members, and means for depressing the external ridge of upset metal at the exterior of the welded joint to a point no higher than the level of the adjacent metal are interconnected and are movable as a unit into and out of operative relation with the members to be welded and with the finished container; to provide a novel sizing ring which, when forced over the upset metal at a welding zone after a pressure welding operation, depresses the upset metal below the level of the adjacent portions of the container while preventing seizing, scratching, scoring or other injury to the upset metal or the surface of adjacent metal; and to provide in novel manner for maintaining weldable metal members being pressure butt welded in accurate longitudinal alignment throughout the welding operation and for depressing the crest of the ridge of upset metal below the level of the exterior surface of the thus welded structure while such upset metal is still at or near a welding temperature. These and other objects will be apparent from the following description.

In accordance with a preferred form of the invention for the production of cylinders or containers for high pressure gases such as acetylene, hydrogen, propane, oxygen, etc., two generally cylindrical sections or shells are placed with the clean peripheral end surfaces to be united in abutting contact under pressure. Preferably such surfaces have a slight taper to provide when abutted an included angle of around 8° to 12° open at the outer margin of the members. With the members in position to be welded, a mobile unit, comprising two aligning rings adapted to slide along the peripheral surfaces of the shells and to insure accurate alignment thereof, and a welding mechanism, is moved into position with the aligning rings snugly fitting around the respective shells, and the welding mechanism disposed adjacent the interface between the abutting margins of the shells.

In the preferred form of the invention the welding heat is supplied by flames from an annular oxy-fuel gas torch head forming an integral part of the unitary mobile aligning, welding, and upset metal sizing unit; and one of the aligning rings which also functions as an ironing and sizing device is formed of chilled iron having a thin plating of chromium or similar hard metal or alloy, or is in the form of a highly polished ring of a hard wear-resistant metal or alloy such as those of the class of non-ferrous alloys composed of cobalt, chromium and tungsten.

The welding preferably is conducted at temperatures not substantially higher than the solidus temperature of the metal. When welding a girth seam joining two half-shells of steel of $\frac{3}{16}$ inch thickness to form a cylinder 11¾ inches in inside diameter, a temperature of 1,200° C.–1,300° C. and a welding pressure of around 4,500 pounds per square inch give good results.

After completion of the welding operation, which is determined by the amount of shortening of the members as the metal at the abutting ends is displaced laterally, the welding flames are extinguished, and the aligning members are withdrawn from the welded container in such manner that the one combined aligning ring and ironing or sizing device forces the upset metal in its path inwardly until the crest of the ridge of upset metal is substantially level with the adjacent exterior surface of the container, as shown in the accompanying drawings.

Since the upset metal is still at high temperature, and since the sizing member has a chromium-plated or other highly polished surface, no seizing and disfiguration of the surface of the metal displaced occurs. This is accomplished expeditiously as an integral part of the welding operation in a simple and positive manner without appreciable additional expense or loss of time.

In the accompanying drawings wherein are illustrated certain preferred forms of the invention, Fig. 1 is a side view of the apparatus, parts being omitted, and other parts being shown in section;

Fig. 2 is a section taken along the line 2—2 of Fig. 1, looking in the direction of the arrows;

Fig. 3 is a section taken along the line 3—3 of Fig. 1, looking in the direction of the arrows, parts being omitted;

Fig. 4 is a fragmentary section taken along the line 4—4 of Fig. 1, looking in the direction of the arrows;

Fig. 5 is a section taken along the line 5—5 of Fig. 1, looking in the direction of the arrows, but with the cradle in the discharge position, parts being broken away, and other parts being omitted;

Figs. 6 to 8, respectively, are transverse sections taken across two abutting members at successive stages of the welding and sizing operations, showing the contours of the members and the relationship of the welding and sizing mechanisms; and Fig. 9 is a fragmentary view of a compressed gas cylinder having a welded joint made in accordance with the invention.

Referring to the drawing, the apparatus has two spaced end frame members 11, 13, supported on a bed formed of longitudinal frame members 15, 17, and transverse members 19. The end members 11 and 13 are secured together by three equally spaced connecting guide rods 21.

For supporting two shell halves S, S', to be joined by welding them together at the open ends, a metal backing plate 23 has one end secured to a shaft 25 which in turn has a threaded portion engaging an internally-threaded thrust member 27 mounted in frame member 11 for adjustment of shaft 25 longitudinally of the bed. The other end of plate 23 has a concave or hollow surface adapted to engage the outer end of one of the shell members to be welded.

A second backing plate 31, similar to plate 23, has an end secured to a rod 33 connected with the piston of a hydraulic jack 35 carried upon frame member 13, whereby operation of the jack 35 moves plate 31 toward or from plate 23 and forces together the open margins of shell sections S, S', the opposite ends of which rest within the recesses in plates 23 and 31.

For aligning the shell sections to be welded and for maintaining such alignment during and subsequent to a welding operation, a pair of spaced plates 37, 39, having central passages extending therethrough, are mounted for sliding movement along the guide rods 21. The plates 37, 39 are interconnected at three equally spaced points and also are connected with the pistons of each of three hydraulic jacks J, J' and J² (only two of which are shown), by means of connecting rods 41, 42, 43, and spacers 44. By operating the jacks J, J' and J² in unison, the plates 37, 39 are moved to operating position shown in full lines in Fig. 1 embracing the abutting ends of the shells to be welded, or are retracted away from the welding position, as shown in broken lines in Fig. 1.

Secured by bolts or the like within offset portions of the central passages in the respective plates 37 and 39 are aligning rings 47, 49, of steel or other hard metal or alloy, each having its internal diameter sized to contact the periphery of the outer surface of a corresponding metal shell or half section to be welded, and preferably tapered to limit the surface of such contact, as shown in Figs. 1 and 6 to 8 of the drawings.

All or at least the tapered working surface of the metal ring 49 mounted on plate 39 has a highly polished surface of a hard, abrasion-resistant metal or alloy such as obtained by chromium plating a hard steel die; or the working surface of the sizing ring can be made of a plating or a welded-on layer of a wear-resistant non-ferrous alloy, such as one of chromium, cobalt and tungsten, that has a polished finish.

For supplying welding heat to the abutting margins of the shell halves, in the form of the apparatus shown, an annular welding head 53, having a plurality of radially-disposed discharge tips 54 for an oxy-fuel gas mixture, and supplied with the latter in well-known manner through connections (not shown), has connected therewith an annular supporting member 55 mounted for free rotary movement within circumferential grooves in three uniformly spaced rollers 56 disposed between the plates 37 and 39. Each roller 56 is mounted for free rotation on a corresponding shaft 57 having one end secured to plate 37, and having the other end freely extending through a passage in plate 39 and provided with a nut and washer 58. Mounted on each shaft 57 and operatively interposed between the roller 56 and the washer 58 is a spacer member 59 and a compression spring 60. Operatively interposed between each roller 56 and the plate 37 for axial sliding movement along a corresponding shaft 57 is a spacer member 61 having a beveled tapered surface 62. For moving the rollers 56 and associated welding head 53 back and forth between the plates 37, 39, a metal ring 65 is mounted for limited rotary movement upon three rollers 67 carried by plate 37. The ring 65 has three spaced ears 68, each provided with an open slot 69 adapted to house a corresponding one of the shafts 57. Each ear 68 has a tapered or wedge shaped surface 70 engaging the tapered surface 62 of an associated spacer 61. A lever 71 is pivoted to plate 37 at 72, and is connected to ring 65 through link members 73, 74. The arrangement of parts is such that movement of lever 71 in one direction causes the cooperating wedge surfaces 62, 70 to slide along each other and move the rollers 56 and welding head toward plate 39 against the action of the springs 60; while movement of the lever in the opposite direction permits springs 60 to force the rollers and the welding head toward plate 37.

For oscillating the annular welding head 53 around its axis a motor 77 (see Fig. 3) is mounted on a support 78 carried by plate 39 and drives a cam 79 through reduction gear 80. A cam follower 81 is rotatably mounted in an elongated slot in an arm of a lever 82 secured to member 55, and rides on cam 79. A tension spring 83 connects the end of the lever arm with the support 78. Thus, during operation of the motor the member 55 and the welding head are oscillated upon rollers 56 along a selected path at a selected rate.

For supporting the shells S, S', at points intermediate the backing plates 23, 31 prior to forcing the shells together under pressure of the hydraulic jack 35, there is provided a cradle having two end members 85, 85' secured as by welding to a plate 86 adapted to slide upon supporting I-beam 87 carried by frame members 19. Three shell supporting members 88, 88', 89, having upper surfaces curved to accommodate the outer surfaces of the shells are attached to two supports 90, 90' secured upon the end members 85, 85'. Tie rods 91 connect members 85, 85'.

The plate 39 is connected with an end member 85 by a loose connection which includes two rods 93 (see Figures 2 and 3), each having an end connected with plate 37, and having the other end extending freely through apertures in plate 39 and in end member 85 and provided with a threaded nut 93'. (See Fig. 5.) The arrangement is such that, during movement of the plate 37 to the right in Fig. 1, the rods 93 move the cradle to a position centrally of the apparatus between the frame members 11, 13; while upon movement of the plates 37, 39 to the left, after the shells are in abutting contact, the forward end of plate 39 contacts the shell supporting member 88 and forces the cradle to the left to the position shown in Fig. 1.

For removing the welded shell from the apparatus, a shell contacting bar 96 is secured upon arms 97 pivoted upon a shaft 98 carried by members 85, 85'. A handle 99 is secured to a cross-bar connecting the arms 97, 97. The finished shell may be withdrawn along inclined rails 100, shown in broken lines in Fig. 5, upon raising the handle 99.

For operating the jack 35, each of the respective fluid lines 101, 102, is connected through four-way valves V with a line connected with a source of fluid under pressure and with a fluid discharge line. Similarly, for operating the cylinders J, J', J'', each of the fluid lines 103, 104 is connected through four-way valves V' with a line leading to a source of fluid under pressure and with a fluid discharge line. (See Fig. 1.)

In practising the process, utilizing the apparatus shown in Figures 1 to 5, the plates 37, 39 are retracted to the position shown in broken lines in Fig. 1, with the cradle disposed centrally between frame members 11, 13. The shells S, S' are positioned on the cradle members 88, 88', 89 with an end of one in the depression in backing plate 23. The jack 35 is actuated to contact the backing plate 31 with the end of the other half shell and to force the adjacent margins of the shells into abutting contact under pressure. Jacks J, J' and J² then are actuated to move the plates 37, 39 to the left. The aligning member 49 slides along the shells to the position shown in full lines in Fig. 1, and aligning member 47 slides along half shell S to the position shown, with the welding head 53 disposed opposite the interface formed by the abutting shells. Concurrently the cradle is forced by plate 39 to the left out of contact with the shells, to the position shown in Fig. 1. Flow of an oxy-fuel gas mixture to the welding head then is initiated, and the gas is ignited at the welding tips 54; and the motor 77 is actuated to oscillate the welding head. The handle 71 then is actuated to cause the welding head to reciprocate back and forth across the welding interface at a selected rate and over a selected path. If desired, the pressure applied through jack 35 may be increased during the welding operation.

As the shells at and adjacent the abutting margins reach a welding temperature the heated metal becomes plastic and, under the pressure employed, permanently unites the shells and is upset laterally to form a joint having the general contour shown in Fig. 7. The shells S, S' concurrently are shortened by this flow of plastic metal.

When the welding operation is complete, as indicated by a selected shortening of the abutted shell sections, the welding heat is discontinued, either manually or by automatic means (not shown), such as electrical limit switches. Thereafter, while the metal at the welded joint is still at a red heat, the jacks J, J', J² are actuated to retract the plates 37, 39 to the initial position. As the aligning and sizing ring 49 contacts the external ridge of upset metal at the welded joint the metal is depressed inwardly and smoothly ironed, without eliminating the outer ridge of upset metal, until the crest of the ridge is substantially level with the exterior surface of the shell at points remote from the joint. Due to the plating of chromium or other hard metal on the tapered, working surfaces of ring 49, this is accomplished without gouging, scratching, or otherwise marring the outer surface of the welded shell at the welded zone.

Important features of the invention involve the use of a welded joint sizing operation as an integral part of the welding cycle, and the use of novel welding apparatus wherein means for aligning and maintaining two members to be welded in accurate alignment during a welding operation, and for eliminating from the welded joint upset metal normally extending beyond the lateral surfaces of the members, and means for supplying the welding heat, are movable as a unit into and out of operative position. When the heating means has mechanism for oscillating it around the peripheries of the members, and/or mechanism for reciprocating it back and forth across the interface between the abutting members, such mechanism also is movable with the aligning, welding and sizing elements as a unit to and from operative position.

This arrangement affords a simple structure that facilitates the rapid but accurate production of welded containers and other hollow articles with a minimum of expense for labor and materials. Prior to this invention the manufacture of such a welded container or similar article necessitated a welding operation, and a separate operation wherein the metal at the welded joint again was heated to a plastic state preparatory to a high temperature metal trimming operation or the equivalent.

Preferably the margins to be united are beveled to provide, when abutted, an outside included angle of around 8°–12°, as shown in Fig. 6, although unbeveled surfaces may be employed. The welded joint, prior to retracting the aligning members and the ironing, smoothing and resizing of the upset metal ridge by the member 49, has a sectional contour like that shown in Fig. 7. After the sizing member has passed across the joint, the crest C of the external circumferential ridge of upset metal has been depressed to a position substantially level with the outer surface of the members remote from the joint, as shown in Fig. 8. Two shallow circumferential grooves are formed closely adjacent said ridge, one on each side thereof, during the sizing operation. As the ironing member 49 irons down the outer ridge of upset metal, the inner ridge of upset metal is forced inwardly a slight amount; but this does not impair the strength of the joint nor materially reduce the internal diameter of the welded article.

Fig. 9 illustrates a typical cylinder for high pressure combustible gas made from two half shells by the process and apparatus of this invention. The crest C of the ridge of upset metal at the welded joint or zone W does not extend above the level of the adjacent portions of the external surface of the cylinder. The two shallow peripheral reinforcing grooves or corrugations formed at each side of the ridge are clearly shown.

Each welded article, as it is discharged from the apparatus, has in the welded zone the high quality metallographic structure characteristic of members welded at temperatures not substantially higher than the solidus temperature of the metal. At the same time the outer surface of the article is free from upset metal extending outwardly beyond the normal outer surface level of the article, and is free from gouges, scratches and similar surface irregularities at and adjacent the welded zone.

While the invention has been illustrated in connection with the use of oxy-fuel gas heating means, it will be understood that any suitable source of high temperature welding heat may be employed, such as an electric current induced in the metal of the article from a source of high frequency electric current.

If desired, the welded joint may be given a subsequent heat treatment to refine the grain structure of the metal and to improve the ductility and other physical properties of the joint.

This application is a division of my copending application, Serial No. 617,601, filed September 20, 1945, now Patent No. 2,538,882, issued January 23, 1951.

The invention is susceptible of modification within the scope of the appended claims; and some features of the invention may be used without others.

I claim:

1. In apparatus for butt welding members of weldable metal having means for applying welding heat to the portions of said members to be welded, and means for applying pressure to said members to force the heated portions together and to upset metal along the welded joint, the improvement which comprises a combined aligning and ironing device, means for positioning said device so as to align one of said metal members relatively to the other during welding, and means for moving said device from such aligning position longitudinally of said metal members and transversely across the welded joint and through the zone of the hot upset metal to iron the latter to substantially the level of the adjoining surfaces of said members.

2. Apparatus for butt welding hollow members of weldable metal, which comprises, in combination, mechanism for aligning said members with at least a portion of each of the opposing surfaces thereof in abutting relation; means for applying welding heat to each of said members at and adjacent such abutting surfaces; means for forcing the abutting surfaces together under pressure and for forcing outwardly beyond the outer surfaces a ridge of metal that has been softened and upset by the welding heat; said aligning mechanism comprising a combined aligning and sizing device including an annular ironing die having a surface adapted to contact the outer peripheral surface of each member, and means for moving the aligning mechanism including the sizing device along said members in a path which includes the zone of said upset metal, at least said contacting surface of the annular die being made of a wear-resistant metal; and means for concurrently moving said aligning mechanism and said welding heat applying means as a unit into and out of operative position relative to said metal members.

3. Apparatus for butt welding hollow members of weldable metal, which comprises, in combination, mechanism for aligning said members with at least a portion of each of the opposing surfaces thereof in abutting relation; means for applying welding heat to each of said members at and adjacent such abutting surfaces; means for forcing the abutting surfaces together under pressure and for forcing outwardly beyond the outer surfaces a ridge of metal that has been softened and upset by the welding heat; said aligning mechanism comprising a combined aligning and sizing device including an annular die having a surface adapted to contact the outer peripheral surface of each member, and means for moving the aligning and sizing mechanism along said members in a path which includes the zone of said upset metal, at least said contacting surface of the annular die being made of a wear-resistant metal; and means for concurrently moving said aligning mechanism and said welding heat applying means into and out of operative position adjacent said abutting surfaces, and for moving said combined aligning and sizing device along said path, thereby quickly forcing inwardly the softened upset metal of said ridge while it is still at a high temperature until the crest of said ridge is not substantially higher than the normal outer surface level of said members at points remote from said ridge and forming shallow grooves on each side of said ridge.

4. Apparatus for butt welding hollow metal members having ends of the same cross-sectional size, which apparatus comprises, in combination, mechanism for aligning said members and for continuously maintaining the opposed ends thereof in abutting relation during a welding operation; oxy-fuel gas means for directing welding heat upon each of said members at and adjacent such abutting ends; means for forcing said ends together under high pressure and for forcing outwardly at the external surface of the members a ridge of metal softened by the welding heat; said aligning mechanism comprising a combined aligning and sizing device including an annular ironing and sizing die having a thin working surface of a wear-resistant metal, and means for forcing said die through the zone of upset metal for depressing the crest of the outer ridge of upset metal to a level not substantially above that of the outer surfaces of the members remote from said ridge.

5. Apparatus for butt welding hollow metal members having ends of the same cross-sectional size, which apparatus comprises, in combination, mechanism for aligning said members and for continuously maintaining the opposed ends thereof in abutting relation during a welding operation; oxy-fuel gas means for directing welding heat upon each of said members at and adjacent such abutting ends; means for forcing said ends together under high pressure and for forcing outwardly at the external surface of the members a ridge of metal softened by the welding heat; said aligning mechanism comprising a combined aligning and sizing device including an annular die having a thin working surface of a wear-resistant metal, means for forcing said die through the zone of upset metal for depressing the crest of the outer ridge of upset metal to a level not substantially above that of the outer surfaces of the members remote from said ridge; and means independent of the pressure applying means for moving the aligning mechanism and the heating means as a unit into and out of operative position relative to said members.

6. Apparatus for butt welding hollow metal members having ends of the same cross-sectional size, which apparatus comprises, in combination, mechanism for aligning said members and for continuously maintaining the opposed ends thereof in abutting relation during a welding operation; oxy-fuel gas means for directing welding heat upon each of said members at and adjacent such abutting ends; means for forcing said ends together under high pressure and for forcing outwardly at the external surface of the members a ridge of metal softened by the welding heat; said aligning mechanism comprising a combined aligning and sizing device including an annular die having a thin working surface of a wear-resistant metal, means for forcing said die through the zone of upset metal for depressing the crest of the outer ridge of upset metal to a level not substantially above that of the outer surfaces of the members remote from said ridge; and means for moving the aligning mechanism and the heating means as a unit into operative position relative to said members and for withdrawing the heating means and the combined aligning and sizing device as a unit from operative relation with said members and for moving said sizing device through the zone of said ridge of upset metal.

7. Apparatus for butt welding hollow metal members having ends of the same cross-sectional size, which comprises, in combination, means for supporting two of such metal members to be united with an end of each in abutting relation; means for forcing the abutting ends together under high pressure; means for aligning said members and for continuously maintaining the opposed ends thereof in abutting relation during a welding operation; welding head means for directing a plurality of welding flames upon all portions of each of such members at and adjacent such abutting ends; means for moving said welding head back and forth across the interface formed by the abutted members; means for oscillating said welding head along the outer peripheral surfaces of said members; said aligning means comprising a combined aligning and sizing device including an annular die having a working surface of a wear-resistant metal, and means for forcing said die through the zone of an annular ridge of upset metal softened by the welding heat and forced laterally at the abutting margins by action of said pressure means, thereby depressing the crest of the outer ridge of upset metal to a level not substantially above that of the outer surfaces of the members remote from said ridge; and mechanism independent of said pressure applying means for moving as a unit into and out of operative position relative to said abutting members said aligning means, heating means, the respective means for reciprocating and for oscillating said heating means and said sizing mechanism.

References Cited in the file of this patent

UNITED STATES PATENTS

| Number | Name | Date |
| --- | --- | --- |
| 972,928 | Schneider | Oct. 18, 1910 |
| 1,115,195 | Hendee | Oct. 27, 1914 |
| 2,061,287 | Muehl | Nov. 17, 1936 |
| 2,538,882 | Schonberg | Jan. 23, 1951 |
| 2,597,153 | Lagarde | May 20, 1952 |